United States Patent [19]
Amano

[11] Patent Number: 5,701,539
[45] Date of Patent: Dec. 23, 1997

[54] CAMERA

[75] Inventor: Kenichiro Amano, Tokyo, Japan

[73] Assignee: Canon Kabushiki Kaisha, Tokyo, Japan

[21] Appl. No.: 650,886

[22] Filed: May 17, 1996

[30] Foreign Application Priority Data

Jun. 1, 1995 [JP] Japan .................. HEI 07-156675

[51] Int. Cl.⁶ .................. G03B 1/00; G03B 7/00; G03B 17/26
[52] U.S. Cl. .................. 396/515; 396/207; 396/410; 396/512
[58] Field of Search .................. 354/21, 214, 275, 354/173.1, 171; 396/207, 390, 405, 410, 511, 515, 516, 512

[56] References Cited

U.S. PATENT DOCUMENTS

| | | | |
|---|---|---|---|
| 5,321,455 | 6/1994 | Cocca | 354/275 |
| 5,457,510 | 10/1995 | Yamazaki et al. | 354/21 |
| 5,497,213 | 3/1996 | Yoshida et al. | 354/21 |
| 5,530,498 | 6/1996 | Miyazaki et al. | 354/21 |
| 5,539,484 | 7/1996 | Wakabayashi | 354/21 |
| 5,541,681 | 7/1996 | Cocca et al. | 354/21 |
| 5,548,359 | 8/1996 | Wakabayashi | 354/21 |
| 5,552,843 | 9/1996 | Yokonuma et al. | 354/21 |

*Primary Examiner*—A. A. Mathews
*Attorney, Agent, or Firm*—Robin, Blecker, Daley and Driscoll

[57] ABSTRACT

In a camera arranged to use a film cartridge having a rotary member which rotates in association with transport of a film and which is provided with a code indicative of information about the film, a rotating state of the rotary member is detected in rewinding the film, so that the film can securely be wound into the film cartridge.

12 Claims, 7 Drawing Sheets

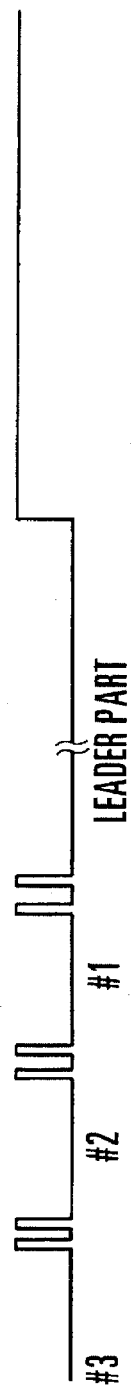
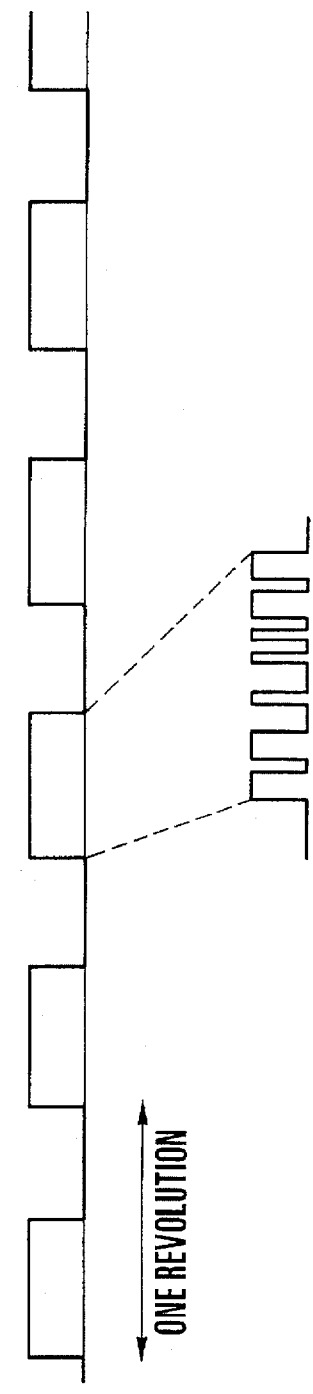
FIG.6(A)
FIG.6(B)

CAMERA

BACKGROUND OF THE INVENTION

1. Field of the Invention

This invention relates to a camera capable of reading bar code information which is provided on a film cartridge.

2. Description of the Related Art

Various methods have heretofore been developed for controlling the transportation of film by using a data disk signal obtained by reading information from a data disk which is provided integrally with a film supply spool of a film cartridge. For example, a method of using the data disk signal in place of a film transport control signal is disclosed in Japanese Laid-Open Patent Application No. HEI 4-316027. A method of detecting the success or failure in sending a film out of the film cartridge by using the rotation of the data disk is disclosed in Japanese Laid-Open Patent Application No. HEI 4-324432. A method of detecting the tension of film transportation on the basis of the data disk signal is disclosed in Japanese Laid-Open Patent Application No. HEI 5-53189. However, with regard to control over a film rewinding action, none of these known methods have taken into consideration the use of the data disk signal.

Some of the known cameras have been arranged to rewind a film in accordance with a procedure set forth as shown in a flow chart in FIG. 7. Referring to FIG. 7, a rewinding action of the film begins at a step S114. When two perforations are detected at a step S115, the current frame number is decremented by one at a step S116. After that, a check is made for the frame number at a step S117. If the frame number is found to be "0", a check made at a step S118 to find if the leading end part of the film has passed a certain point. If so, a timer is started to count a predetermined period of time at a step S600. After the end of the time count by the timer, the flow comes to a step S120 to set a usage condition setting part of the film cartridge to a predetermined film usage condition. The rewinding action of the film comes to an end at a step S121.

Thus, upon completion of the time count by the timer after passing of the leading end part of the film, the film usage condition setting part of the film cartridge is set and the rewinding action is brought to an end. In this case, however, the predetermined time to be counted by the timer is set to a period of time including a sufficient length of margin to have the film completely wound into the film cartridge without fail even if the film transport speed is low due to a low power supply voltage of the camera or a heavy film rewinding load. Therefore, if, on the contrary, a high power supply voltage or a light film rewinding load allows a high film transport speed, the film supply spool would be compelled to make unnecessary rotation even after completion of rewinding the film into the film cartridge.

SUMMARY OF THE INVENTION

It is an object of this invention to provide a camera which is arranged to solve the above-stated problem of the prior art and to be capable of promptly completing film rewinding without any wasteful action irrespective of such conditions as a high or low power supply voltage.

To attain the above-stated object, in accordance with one aspect of the invention, there is provided a camera arranged to use a film cartridge having a rotary member which rotates in association with transport of a film and which is provided with a code, the camera comprising a rotation detecting circuit for detecting a rotating state of the rotary member, and a control circuit for controlling a rewinding action of the film on the basis of the rotating state detected by the rotation detecting circuit in rewinding the film.

In accordance with another aspect of the invention, to attain the above-stated object, there is provided a camera arranged to use a film cartridge having a rotary member which rotates in association with transport of a film and which is provided with a code, the camera comprising a rotation detecting circuit for detecting a rotating state of the rotary member, and determination means for, after a predetermined number of revolutions of the rotary member is detected by the rotation detecting circuit in rewinding the film into the film cartridge, determining a setting condition of a usage condition setting part disposed on the film cartridge to indicate a film usage condition.

In accordance with a further aspect of the invention, there is provided a camera arranged to use a film cartridge having a rotary member which rotates in association with transport of a film and which is provided with a code, the camera comprising a film information detecting circuit for detecting film information by reading the code of the rotary member in loading the film cartridge into the camera, and a processing circuit for performing an action other than detecting the film information, by detecting the code of the rotary member in rewinding the film after completion of photographing, so that the code of the rotary member is effectively utilized as the code of the rotary member both for setting the film information and controlling the film rewinding action.

In accordance with a still further aspect of the invention, to attain the above-stated object, there is provided a camera arranged to use a film cartridge having a rotary member which rotates in association with transport of a film and which is provided with a code, the camera comprising a rotation detecting circuit for detecting a rotating state of the rotary member, a rewinding state detecting circuit for detecting whether a process of rewinding the film into the film cartridge has reached a predetermined state in rewinding the film, and a control circuit for controlling a rewinding action of the film on the basis of the rotating state detected by the rotation detecting circuit after the rewinding state detecting circuit detects that the process of rewinding the film has reached the predetermined state.

In accordance with a still further aspect of the invention, to attain the above-stated object, there is provided a camera arranged to use a film cartridge having a rotary member which rotates in association with transport of a film and which is provided with a code, the camera comprising a rotation detecting circuit for detecting a rotating state of the rotary member, a rewinding state detecting circuit for detecting whether a process of rewinding the film into the film cartridge has reached a predetermined state in rewinding the film, and determination means for, after a predetermined number of revolutions of the rotary member is detected by the rotation detecting circuit after the rewinding state detecting circuit detects that the process of rewinding the film has reached the predetermined state, determining a setting condition of a usage condition setting part disposed on the film cartridge to indicate a film usage condition.

The above and other objects and features of this invention will become apparent from the following detailed description of embodiments thereof taken in connection with the accompanying drawings.

BRIEF DESCRIPTION OF THE DRAWINGS

FIGS. 6(A) and 6(B) show, in a timing chart, signals in the camera shown in FIG. 1.

DETAILED DESCRIPTION OF THE PREFERRED EMBODIMENTS (First Embodiment)

Figure 1:
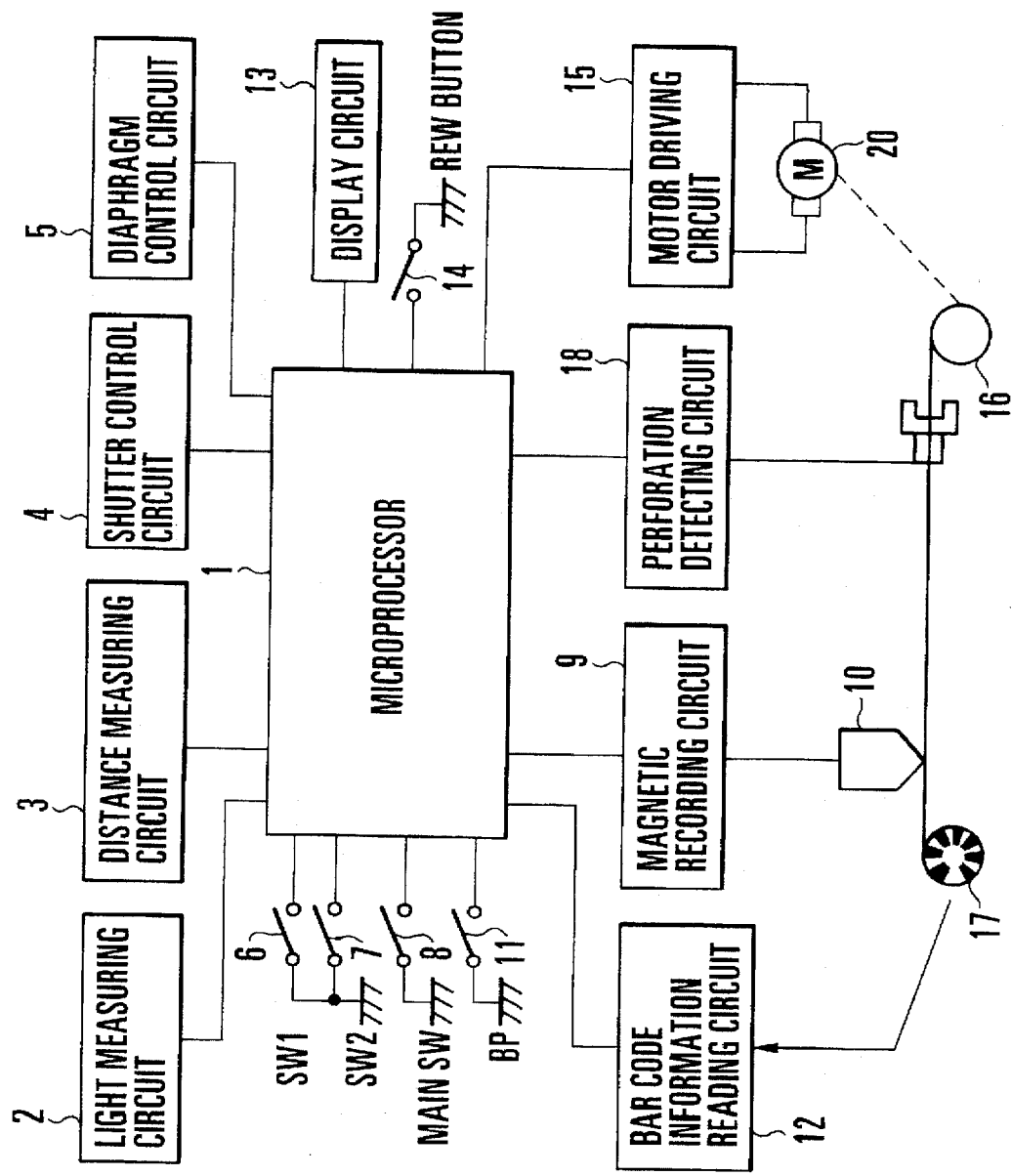
FIG. 1 is a control block diagram showing a camera arranged as a first embodiment of this invention.

FIG. 1 is a control block diagram showing a camera arranged as a first embodiment of this invention. Referring to FIG. 1, the camera includes a microprocessor 1 arranged to exercise control over the whole camera, a light measuring circuit 2, a distance measuring circuit 3, a shutter control circuit 4 and a diaphragm control circuit 5. Each of these parts is arranged in a known manner.

A light-measurement and distance-measurement start switch 6 (SW1) and a shooting action start switch 7 (SW2) are arranged to be turned on respectively by the first stroke and the second stroke of a shutter release button. The camera further includes a main switch 8, a magnetic recording circuit 9, a magnetic head 10, a back lid switch 11 (BP) for detecting the open and closed states of a back lid, a bar code information reading circuit 12 arranged to read information provided in the form of a bar code, a display circuit 13 arranged to show a shutter speed, an aperture value and the presence or absence of a film cartridge and to give warnings with respect to taking out the film, etc., a rewind start button 14 (REW) provided for film rewinding, and a motor driving circuit 15 arranged to drive a motor 20 for transporting a film 16. A rotary member 17 is provided integrally with a film supply spool disposed within a film cartridge which contains the film 16, and rotates in association with the film supply spool. The rotary member 17 serves as a bar code recording part having a bar code recorded on its surface, and is hereinafter referred to as a data disk. A perforation detecting circuit 18, which is also included in the camera, is composed of, for example, light-projecting and light-receiving parts of a photo-interrupter to detect the presence or absence of perforations provided in the film 16.

Figure 5:
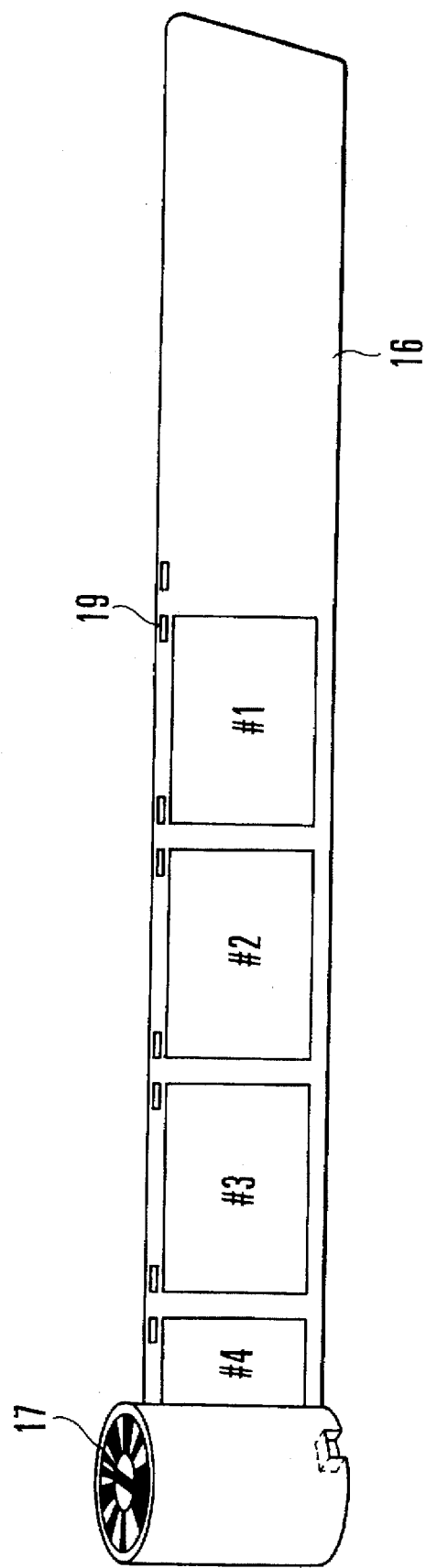
FIG. 5 is an oblique view showing a film to be used by the camera shown in FIG. 1.

FIG. 5 shows the film 16 to be used by the camera of FIG. 1. Referring to FIG. 5, on the data disk (rotary member) 17 which rotates integrally with the film supply spool, information about the film 16, such as the sensitivity of film, the number of usable frames of film, is recorded in the form of a bar code. The film 16 is provided with two perforations 19 per frame.

Figure 2:
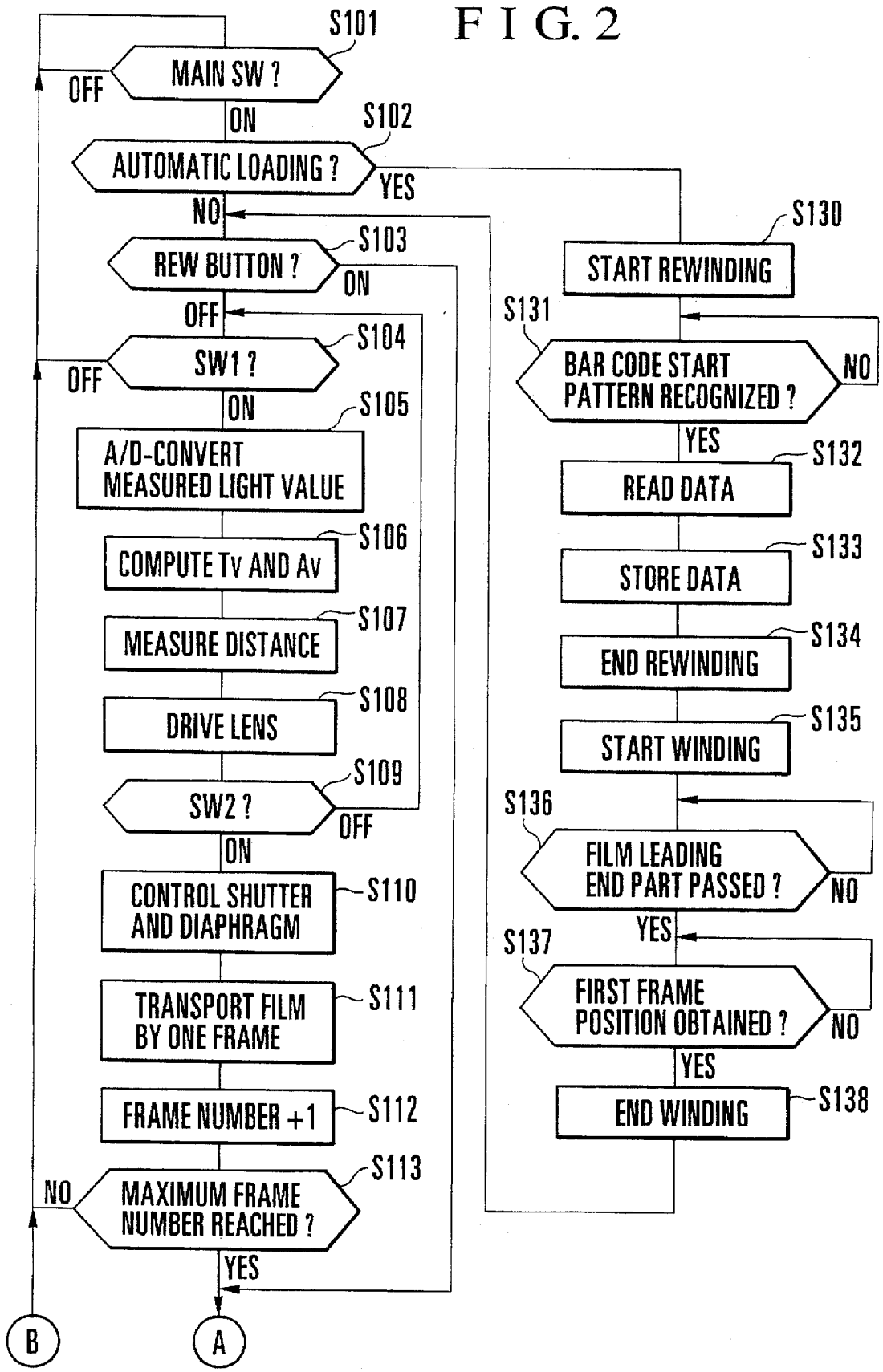
FIG. 2 is a flow chart showing the operation of the camera shown in FIG. 1.
Figure 3:
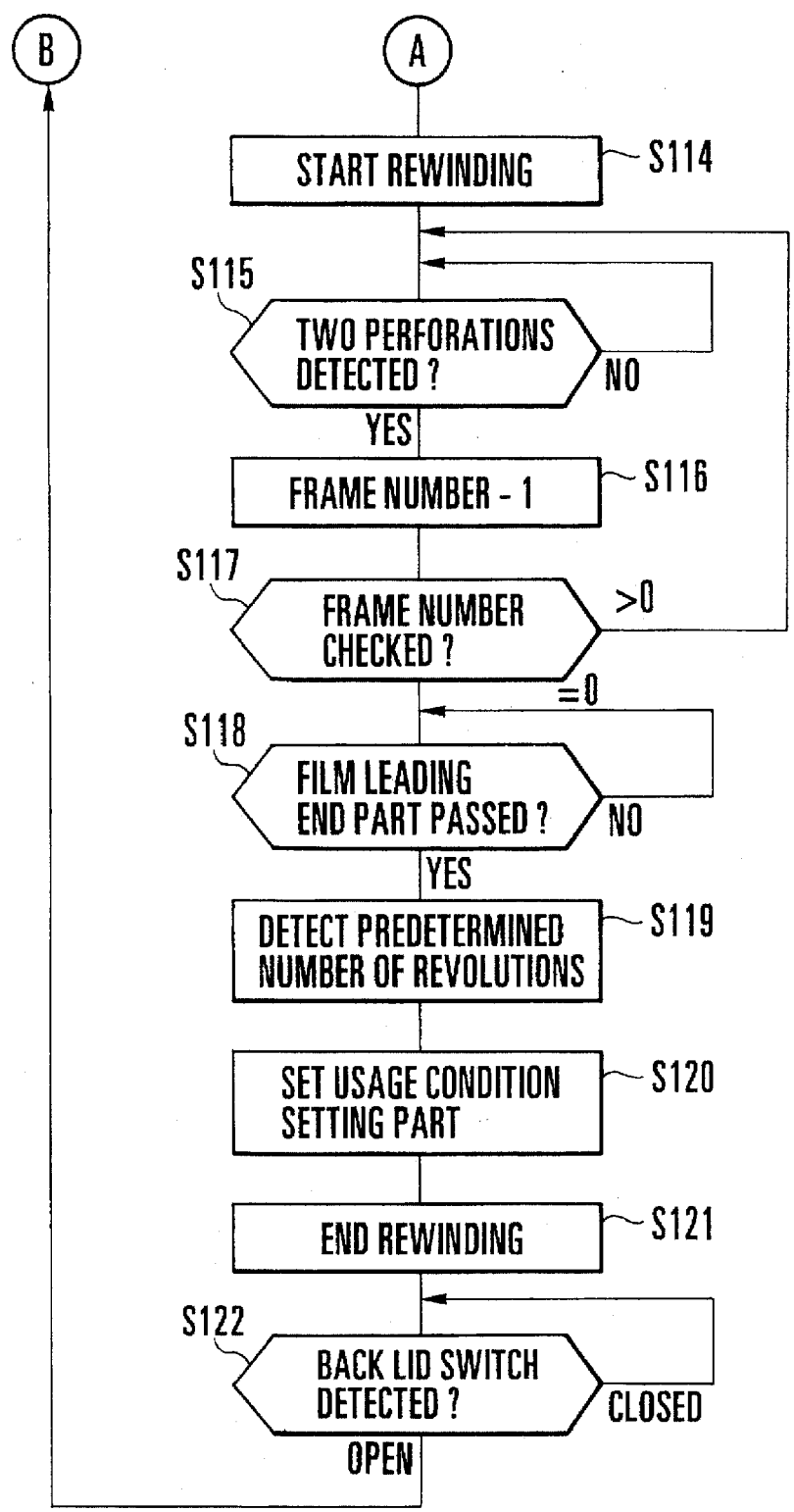
FIG. 3 is a flow chart showing a rewinding action of the film in the camera shown in FIG. 1.

FIG. 2 is a flow chart showing the operation of the camera of FIG. 1. FIG. 3 is a flow chart showing a rewinding action of the film in the camera of FIG. 1. The camera according to the first embodiment of this invention operates as described below with reference to these flow charts.

When the main switch 8 is found to be in an off-state at a step S101, all other switches are rendered inoperative. When the main switch 8 is turned on, the flow of operation proceeds to a step S102. At the step S102, a check is made to find if the camera is to be automatically loaded with the film. If not, the flow proceeds to a step S103. If so, the flow comes to a step S130.

At the step S103, a check is made to find if the REW button 14 is pushed. If so, the flow comes to a step S114. If not, the flow comes to a step S104. At the step S104, a check is made for the state of the switch 6 (SW1). If the switch 6 (SW1) is found to be in an off-state, the flow comes back to the step S101. If the switch 6 is found to be in an on-state, the flow comes to a step S105. At the step S105, a measured light value is obtained by the light measuring circuit 2 and is, then, A/D converted. At a step S106, a shutter time value Tv and an aperture value Av are determined, on the basis of the A/D converted measured light value, by referring to a program stored beforehand in the microprocessor 1. At a step S107, information on a measured distance is obtained from the distance measuring circuit 3. At a step S108, a driving circuit which is not shown is caused to drive the lens on the basis of the information on the measured distance.

At a step S109, a check is made for the state of the switch 7 (SW2). If the switch 7 (SW2) is found to be in an on-state, the flow comes to a step S110 to cause the shutter control circuit 4 and the diaphragm control circuit 5 to perform an exposure action on the film 16. At a step S111, the film 16 is wound up by one frame. At a step S112, the count value of a frame counter is incremented by one. At a step S113, a check is made to find if the frame number has reached a specified frame number (for example, the number of frames read from the data disk 17). If so, the flow comes to the step S114. If not, the flow comes back to the step S101.

After the steps of FIG. 2, the flow of operation comes to a film rewinding operation shown in FIG. 3.

Figure 7:
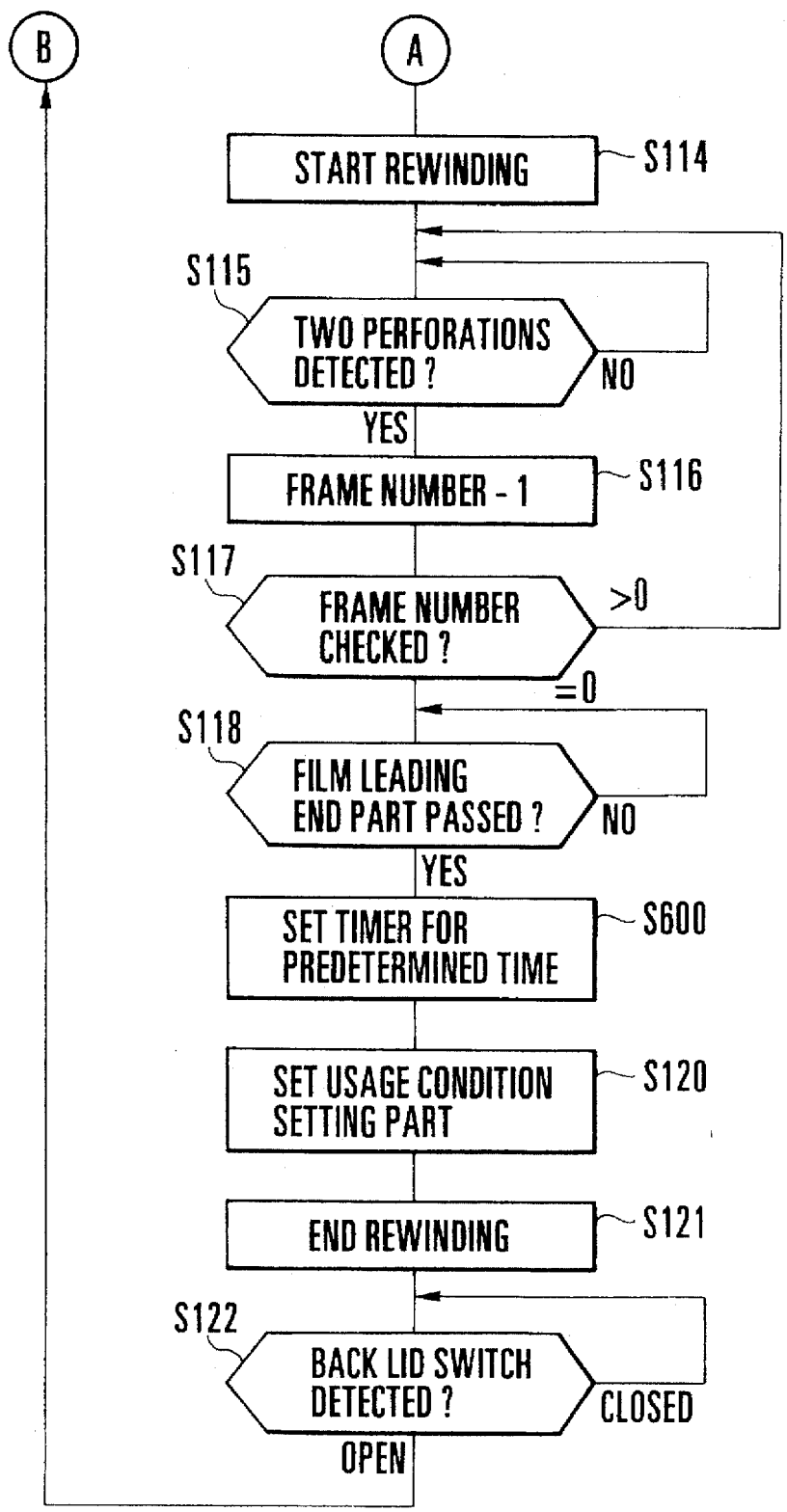
FIG. 7 is a flow chart showing a rewinding action of the film in the conventional camera.

At the step S114 of FIG. 3, with the specified frame number having been reached, the film 16 begins to be rewound at the step S114. At a step S115, the flow waits until two perforations 19 are detected by the perforation detecting circuit 18. When two perforations 19 are detected, the flow comes to a step S116 to have the count number of the frame counter decremented by one. At the step S117, a check is made for the frame number. If the frame number is found not to have reached "0", the flow comes back to the step S115. If the frame number is found to have reached "0", the flow comes to a step S118. At the step S118, a check is made to find if the leading end part of the film 16 has passed the perforation detecting circuit 18. When the leading end part of the film is found to have passed the perforation detecting circuit 18, the flow comes to a step S119. At the step S119, the bar code information reading circuit 12 detects that the data disk 17 makes a predetermined number of revolutions. Unlike the film rewinding action of the conventional camera shown in FIG. 7, the process of the step S119 of the embodiment is arranged to detect the predetermined number of revolutions as described above, instead of using a timer to count a predetermined period of time.

The above-stated predetermined number of revolutions may be a number of revolutions required until the film is completely wound into the film cartridge after passing of the leading end part of the film. The number of revolutions either may be set beforehand at a certain value or may be set by measuring the number of revolutions required until the leading end part of the film passes at the time of automatic loading. Further, the predetermined number of revolutions must be set at least a number of revolutions required until the film is completely wound into the film cartridge.

When the film 16 is judged to have been completely wound into the film cartridge with the predetermined number of revolutions detected at the step S119, the flow comes to a step S120. At the step S120, the usage condition setting part of the film cartridge set to a predetermined film usage condition ("a partly exposed condition" in a case where the film is rewound from a halfway position of the film, or "a full-frame exposed condition" in a case where automatic film rewinding is performed after all the prescribed number of frames have been exposed). At a step S121, the film rewinding action comes to an end. At a step S122, the flow of operation waits until it is detected through the back lid switch 11 that the back lid is opened. The flow then comes back to the step S101. Incidentally, the above-stated setting action on the usage condition setting part is carried out by actuating, with a member which is not shown, a condition setting mechanism (not shown) disposed at the film cartridge.

The processes of steps S130 to S138 shown in FIG. 2 are executed as an automatic film loading routine. When the automatic film loading action is decided to be performed at the step S102, the flow comes to the step S130. At the step S130, preparation for reading the bar code of the data disk 17 on the film cartridge is made by causing the motor driving circuit 15 to start rotating the motor 20 in the direction of film rewinding. At the step S131, the flow waits until a start pattern of the bar code is recognized. When the start pattern is recognized, the flow comes to the step S132 to read data by means of the bar code information reading circuit 12. At the step S133, the data read is stored. At the step S134, the transport of the film in the rewinding direction is brought to an end.

After the step S134, the flow comes to the step S135 to start rotating the motor 20 in the direction of film winding. At the step S136, the flow waits until the leading end part of the film comes to pass the position of the perforation detecting circuit 18. At the step S137, the film is transported until the first frame portion of the film comes to a position where two perforations of the film are detected. At the step S138, the transport of the film in the winding direction is brought to an end to complete the preparation for shooting.

The arrangement described above enables the embodiment to accurately and quickly rewind the film.

(Second Embodiment)

A second embodiment of this invention differs from the first embodiment in the following point. In rewinding the film, a process of detecting a predetermined number of revolutions of the data disk begins at a time point at which the count value of a frame counter becomes "0". When the predetermined number of revolutions is detected, the usage condition setting part of the film cartridge is set to a predetermined film usage condition before the film rewinding action is brought to an end.

Figure 4:
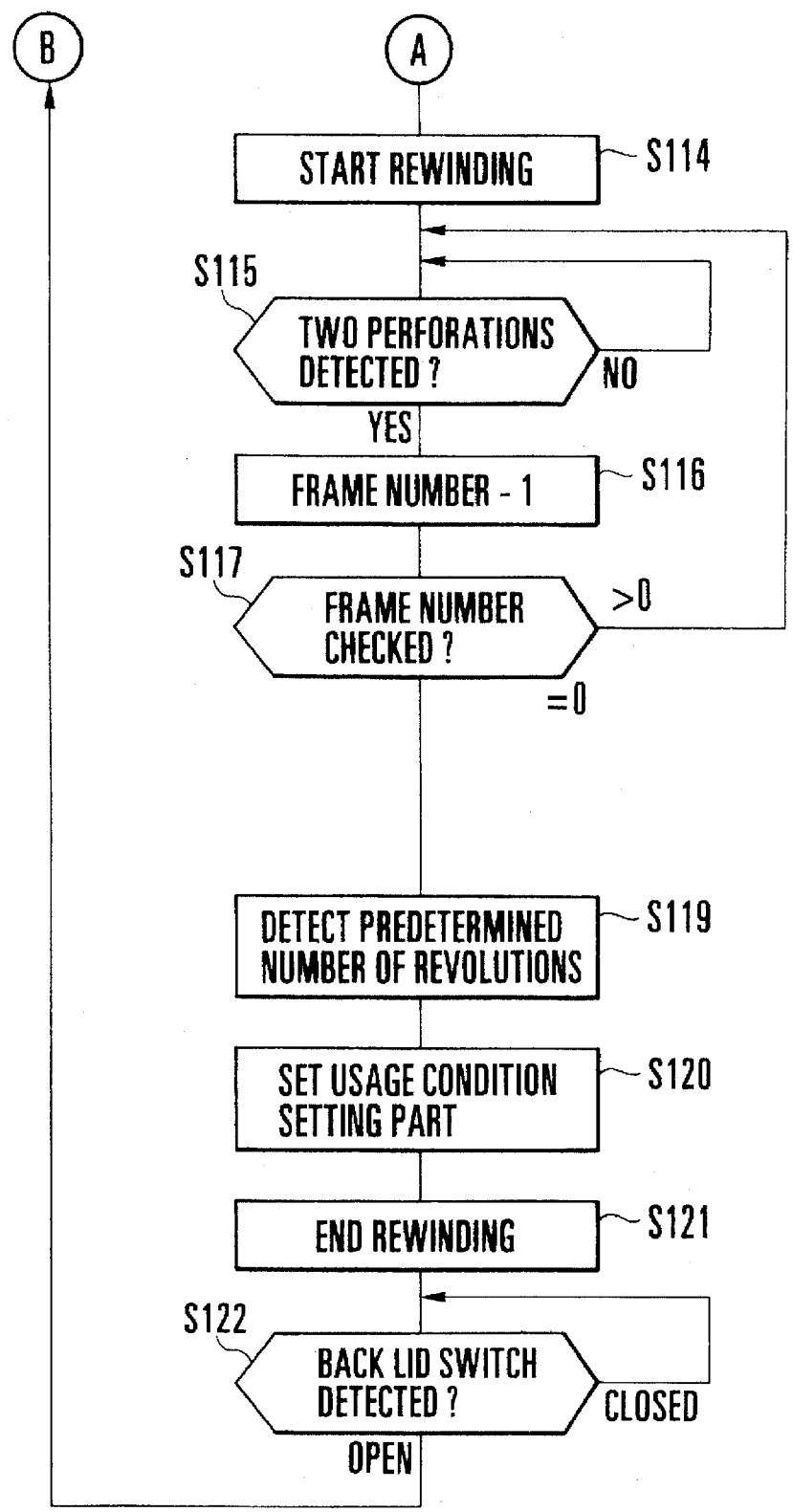
FIG. 4 is a flow chart showing a rewinding action of the film in a camera arranged as a second embodiment of this invention.

FIG. 4 shows, in a flow chart, the rewinding action of the film in the camera according to the second embodiment of this invention. In FIG. 4, the processes of steps S114 to S117 are identical with those of the first embodiment shown in FIG. 3 and are, therefore, omitted from the following description. Further, all the actions of the camera other than the film rewinding action are also the same as those of the first embodiment shown in FIG. 2.

If the count value of the frame counter is found, at the step S117, to have become "0" by detecting the perforations of the first frame portion of the film, the flow comes to a step S119 to immediately cause the bar code information reading circuit 12 to make detection of the predetermined number of revolutions of the data disk 17. Upon detection of the predetermined number of revolutions, the flow comes to a step S120. At the step S120, the usage condition setting part of the film cartridge is set to a predetermined film usage condition. At a step S121, the film rewinding action is brought to an end. At a step S122, the flow waits until the back lid of the camera is opened, and then returns to the step S101. The above-stated process of detecting the count value "0" of the frame counter may be replaced with a process of finding the number of revolutions by detecting perforations of the leader part of the film.

In the case of the second embodiment, unlike the first embodiment, it suffices to detect a number of revolutions required for winding the film 16 back into the film cartridge from the first frame portion of the film 16. Therefore, for the film rewinding action, either a predetermined number of revolutions may be set beforehand or a number of revolutions required until the first frame portion of the film is obtained may be measured at the time of automatically loading the film into the camera.

FIGS. 6(A) and 6(B) show the timing of signals in the camera according to this invention. The first and second embodiments are recapitulated with their advantages with reference to FIGS. 6(A) and (B) as follows.

FIG. 6(A) shows a detection signal produced by the perforation detecting circuit 18, and FIG. 6(B) shows a signal obtained by the bar code information reading circuit 12.

In the first embodiment, when the leading end part, i.e., an end of a leader part, of the film, is found to have passed the perforation detecting circuit 18, the predetermined number of revolutions is detected from a signal obtained by reading the bar code of the data disk 17 as shown in FIG. 6(B). The process of winding the film into the film cartridge is considered to be completed when the predetermined number of revolutions has been detected.

In the second embodiment, when the perforations of the first frame portion of the film are detected by the perforation detecting circuit 18, the predetermined number of revolutions is detected from the signal shown in FIG. 6(B) by counting the number of pulses of the bar code. The process of winding the film into the film cartridge is considered to be completed when the predetermined number of revolutions has thus been detected.

The predetermined number of revolutions is an amount of rotation of the data disk 17 corresponding to an amount of movement of the film from the perforation detecting circuit 18 to a cartridge chamber in the case of the first embodiment. In the second embodiment, the predetermined number of revolutions is an amount of rotation of the data disk 17 corresponding to a distance obtained by adding a length from the first frame to the leading end part of the film to the amount of movement of the film from the perforation detecting circuit 18 to the cartridge chamber.

Therefore, since the completion of rewinding of the film is judged on the basis of the predetermined number of revolutions of the data disk, instead of using a timer like the conventional camera, the first embodiment is capable of accurately rewinding the film without being affected by the condition of a power supply. In addition to the same advantage, the second embodiment has another advantage in that, since the first frame portion of the film is used as the detecting time point, instead of the leading end part of the film, the flow of control operation can be more simply arranged than in the case of the first embodiment.

What is claimed is:

1. A camera arranged to use a film cartridge having a rotary member which rotates in association with transport of a film and which is provided with a code, said camera comprising:

a) a rotation detecting circuit for detecting a rotating state of the rotary member;

b) a rewinding state detecting circuit for detecting whether a process of rewinding the film into the film cartridge has reached a predetermined state in rewinding the film; and c) a control circuit for controlling a rewinding action of the film on the basis of the rotating state detected by said rotation detecting circuit after said rewinding state detecting circuit detects that the process of rewinding the film into the film cartridge has reached the predetermined state, wherein said control circuit stops the rewinding action after the rotary member performs a predetermined amount of rotation detected by the rotation detecting circuit irrespective of the code pattern.

2. A camera according to claim 1, wherein the predetermined amount of rotation is at least a number of revolutions required to completely wind a leading end part of the film into the film cartridge.

3. A camera according to claim 1, wherein said rewinding state detecting circuit is arranged to detect whether a first frame portion of the film or a perforation adjacent to the first frame portion has passed a predetermined position.

4. A camera according to claim 1, wherein said rewinding state detecting circuit is arranged to detect whether a leading end part of the film has passed a predetermined position.

5. A camera according to claim 2, wherein the predetermined amount of rotation is set a according to a number of revolutions detected in sending the film out of the film cartridge during automatic loading.

6. A camera arranged to use a film cartridge having a rotary member which rotates in association with transport of a film and which is provided with a code, said camera comprising:

a) a rotation detecting circuit for detecting a rotating state of the rotary member;

b) a rewinding state detecting circuit for detecting whether a process of rewinding the film into the film cartridge has reached a predetermined state in rewinding the film; and c) determination means for, after a predetermined number of revolutions of the rotary member is detected by said rotation detecting circuit after said rewinding state detecting circuit detects that the process of rewinding the film has reached the predetermined state, determining a setting condition of a usage condition setting part disposed on the film cartridge to indicate a film usage condition.

7. A camera according to claim 6, wherein the predetermined number of revolutions is at least a number of revolutions required to completely wind a leading end part of the film into the film cartridge.

8. A camera according to claim 6, wherein said rewinding state detecting circuit is arranged to detect whether a first frame portion of the film or a perforation adjacent to the first frame portion has passed a predetermined position.

9. A camera according to claim 6, wherein said rewinding state detecting circuit is arranged to detect whether a leading end part of the film has passed a predetermined position.

10. A camera according to claim 7, wherein the predetermined number of revolutions is set according to a number of revolutions detected in sending the film out of the film cartridge during automatic loading.

11. A camera arranged to use a film cartridge having a rotary member which rotates in association with transport of a film and which is provided with a code, said camera comprising:

a) a rotation detecting circuit for detecting a rotating state of the rotary member; and b) a control circuit for controlling a rewinding action of the film on the basis of the rotating state detected by said rotation detecting circuit in rewinding the film, wherein said control circuit stops the rewinding action after the rotary member performs a predetermined amount of rotation detected by the rotation detecting circuit irrespective of the code pattern.

12. A camera arranged to use a film cartridge having a rotary member which rotates in association with transport of a film and which is provided with a code, said camera comprising:

a) a rotation detecting circuit for detecting a rotating state of the rotary member; and b) determination means for, after a predetermined number of revolutions of the rotary member is detected by said rotation detecting circuit in rewinding the film into the film cartridge, determining a setting condition of a usage condition setting part disposed on the film cartridge to indicate a film usage condition.

* * * * *

UNITED STATES PATENT AND TRADEMARK OFFICE
CERTIFICATE OF CORRECTION

PATENT NO. : 5,701,539
DATED : December 23, 1997
INVENTOR(S) : Amano Kenichiro

It is certified that error appears in the above-identified patent and that said Letters Patent is hereby corrected as shown below:

Col. 5, line 7, after "exposed)." Begin new paragraph.

Signed and Sealed this

Twenty-third Day of June, 1998

Attest:

BRUCE LEHMAN

Attesting Officer

Commissioner of Patents and Trademarks